H. W. CHENEY.
SYSTEM OF MOTOR CONTROL.
APPLICATION FILED APR. 15, 1909.

1,011,919.

Patented Dec. 19, 1911.

3 SHEETS—SHEET 1.

Witnesses
Rob. E. Hall
Chas. L. Byron

Inventor
Herbert W. Cheney
By Chas. E. Lord
Attorney

H. W. CHENEY.
SYSTEM OF MOTOR CONTROL.
APPLICATION FILED APR. 15, 1909.

1,011,919.

Patented Dec. 19, 1911.
3 SHEETS—SHEET 2.

Witnesses
Rob. E. Stoll.
Chas. L. Byron

Inventor
Herbert W. Cheney
By Chas. E. Lord
Attorney

H. W. CHENEY.
SYSTEM OF MOTOR CONTROL.
APPLICATION FILED APR. 15, 1909.

1,011,919.

Patented Dec. 19, 1911.

3 SHEETS—SHEET 3.

Witnesses
Rob. E. Still
Chas. L. Byron

Inventor
Herbert W. Cheney
By Chas. E. Lord
Attorney

UNITED STATES PATENT OFFICE.

HERBERT W. CHENEY, OF MILWAUKEE, WISCONSIN, ASSIGNOR TO ALLIS-CHALMERS COMPANY, A CORPORATION OF NEW JERSEY.

SYSTEM OF MOTOR CONTROL.

1,011,919.     Specification of Letters Patent.     Patented Dec. 19, 1911.

Application filed April 15, 1909. Serial No. 490,093.

*To all whom it may concern:*

Be it known that I, HERBERT W. CHENEY, a citizen of the United States, residing at Milwaukee, in the county of Milwaukee and State of Wisconsin, have invented certain new and useful Improvements in Systems of Motor Control, of which the following is a full, clear, and exact specification.

My present invention relates to electric controllers of the compressible resistance type.

The main object of my invention is to provide means by which the resistance of a compressible resistance medium may be varied and the current in the controlled circuit reversed by the operation of a single controller handle.

More specifically considered the object of my invention is to reverse the direction of rotation and to control alternating current motors by the operation of a single handle, which regulates the pressure to which a compressible resistance medium in the secondaries of said motors is subjected, and which controls all circuit connections.

My invention consists in the details of construction and in the arrangement and combination of elements hereinafter set forth and particularly pointed out in the appended claims.

Figure 1:
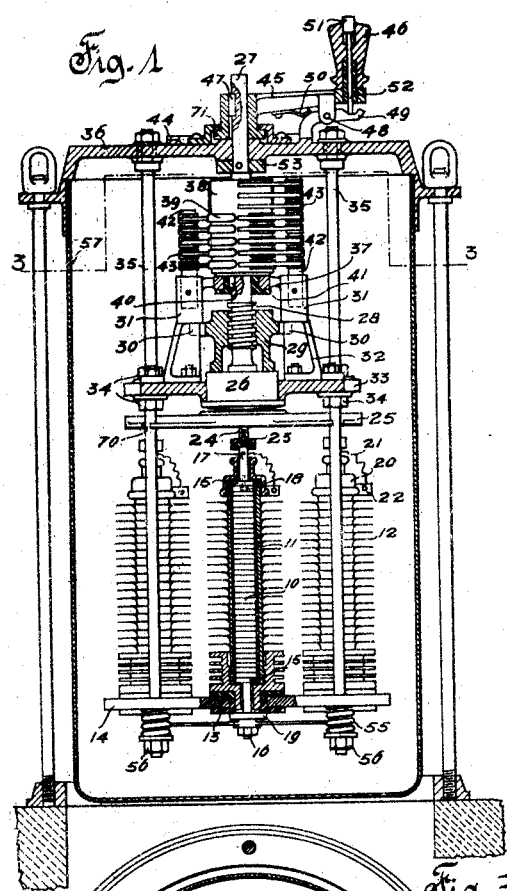
Figure 2:
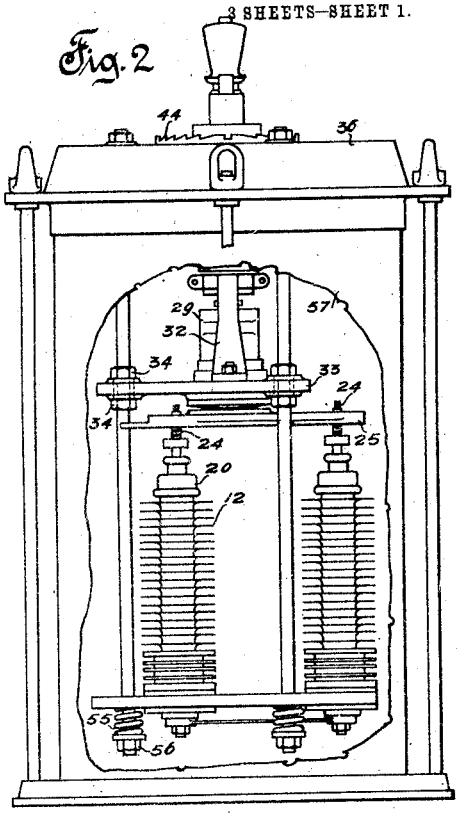
Figure 3:
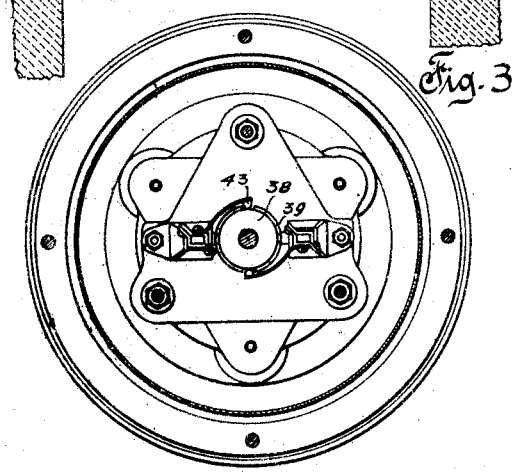
Figure 4:
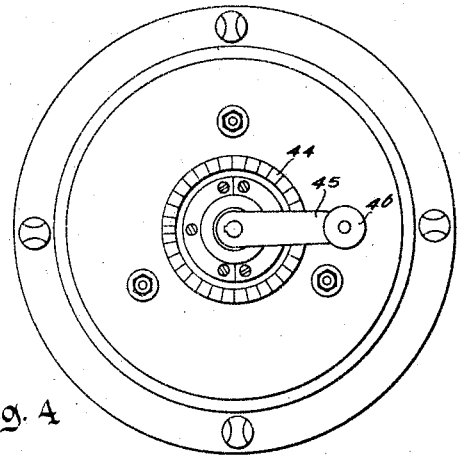
Figure 5:
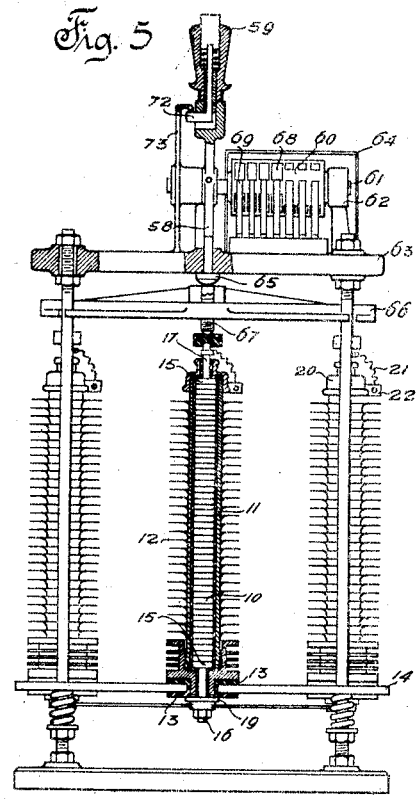
Figure 6:
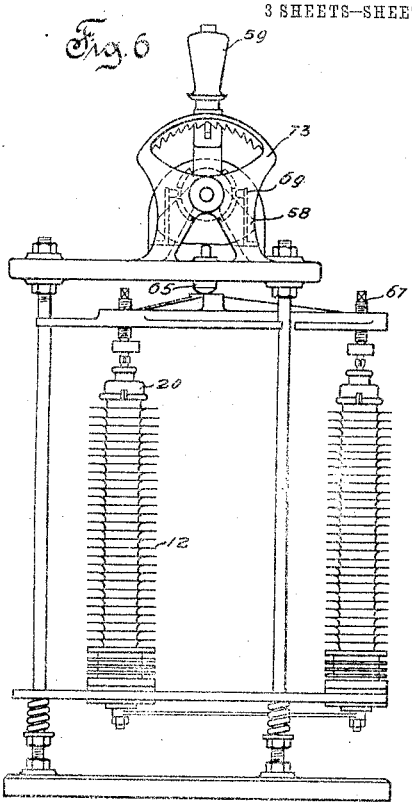
Figure 7:
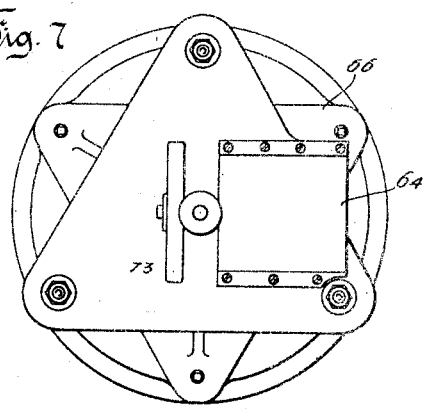
Figure 8:
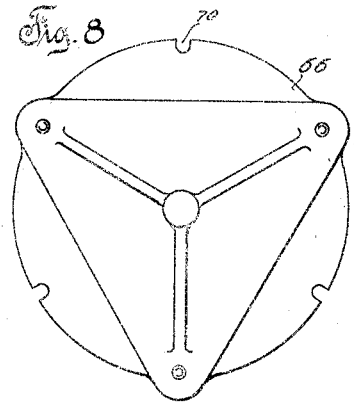
Figure 9:
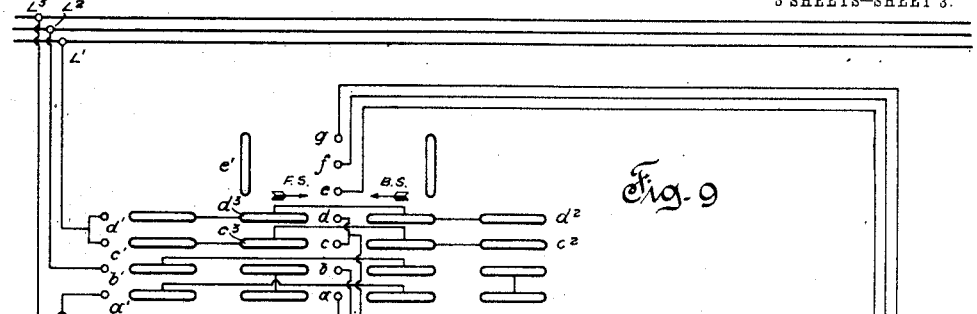
Figure 10:
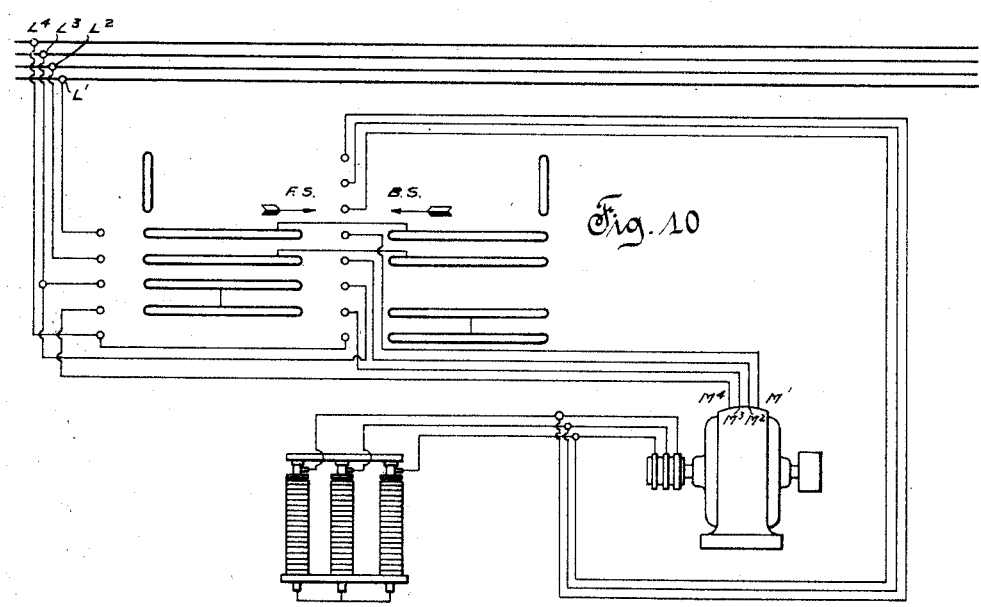

In the accompanying drawings, Figure 1 is a partial vertical sectional view of a controller embodying my invention, showing the general arrangement of various parts; Fig. 2 is another partial sectional view, of the same controller, taken at right angles to Fig. 1; Fig. 3 is a horizontal sectional view on the line 3—3 of Fig. 1; Fig. 4 is a top view of the controller; Figs. 5 and 6 are views corresponding to Figs. 1 and 2, but showing a modified form of controller; Fig. 7 is a top view of the controller shown in Fig. 5; Fig. 8 is a view of the lower plate or equalizing disk shown in Fig. 7; Fig. 9 is a diagram illustrating the circuit connections of the controller in Fig. 1 as connected for a three-phase system; and Fig. 10 is a diagram illustrating the circuit connections of the controller in Fig. 2 as connected for a two-phase system.

In this particular invention I am making use of the fact that the resistance of the resistance medium here used and consisting of piles of carbon disks depends upon the pressure to which the resistance medium is subjected. Other resistance material might be used, but carbon is preferred in this particular case.

Referring now to Figs. 1, 2, 5, and 6, my invention is shown particularly as applied to controllers for rotor-wound polyphase alternating current motors having variable secondary resistances. Carbon piles 10, which are in the secondary circuit of an electric motor, are made up of carbon disks arranged one on top of another. Each pile is inclosed by but insulated from an oil tight metal tube 11 which may be surrounded by a series of heat-radiating rings 12. The lower ends of the tubes are set in insulating bushings 13 which are supported by plates 14. Each pile terminates with metal disks 15 in electrical connection with studs 16 and 17 respectively. The carbon disks directly in contact with these metal disks 15 are a little thicker than the intermediate disks, and are fastened to the metal disks 15 by means of screws 18. The lower studs 16 pass down through the insulating bushings 13 and through collars 19, and are mechanically clamped and electrically connected as shown in Fig. 1. Perforated caps 20 fit tightly over the tops of the tubes 11 and are insulated therefrom. The studs 17 at the upper ends of the tubes extend through the caps, fitting loosely to allow their free upward and downward movement. Flexible connectors 21 join the studs 17 to connection terminals 22. Caps 23 lined with insulation fit over the upper studs 17. Set screws or studs 24 which pass through an equalizing disk 25 bear upon the caps 23. For some reason or other it may be desired to subject one or more of the carbon piles to a greater or less pressure, keeping the pressure on the other pile or piles at a constant value. This is made possible by providing the cap plate 36 of the controller with holes of diameters somewhat greater than the diameters of guide rods 35 which pass through them and also through guide grooves 70 of the equalizing disk 25. The cap plate can be shifted in any desired direction and in this way a transmitting member 26 is shifted from its central position relative to the equalizing disk. The pressure on the pile nearest the transmitting member will be greater than the pressure on the other carbon piles. Pressing downward upon the equalizing disk 25 is a block 26 which transmits motion from a screw operated spindle 27. Engaging the threaded portion 28 of the spindle 27 is a nut 29 having shoulders 30. These shoulders bear against brackets 31 of supporting pedestals 32 and prevent the upward movement of the nut 29 above a predetermined point. The pedestals 32 are tightly bolted or clamped to a table 33 which surrounds the transmitting block 26 and is held firmly in position by nuts 34, which engage the rods 35. These rods 35 are suspended from and fastened to the cap plate 36 of the controller case. The brackets 31 are provided with arms 37 which prevent the downward movement of a drum switch 38, which is in the primary circuit of a motor and connects it to a source of supply. The drum is provided with contact segments 39, the five lower rows of which provide for connections between the main line and the primary of an induction motor. The three upper contact segments are short-circuiting contacts. This drum 38 fits loosely on the spindle 27 and is made to rotate by means of a feather 40 when said spindle rotates. Between the arms 37 and the spindle 27 is an insulating bushing 41 which extends up about one quarter the length of the drum. Mounted in the pedestals 32 and extending upwardly are bars 42 to which contact fingers 43 are clamped, and from which they are insulated. Extending upwardly from the cap plate 36 and preferably integral therewith is a ring or plate 44 having notches. An operating handle 45 movable by a knob 46 at its outer end fits loosely on the upper part of the spindle 27 which is provided with another feather 47. By means of this feather the rotary motion of the handle 45 is transmitted to the spindle 27. Pivoted at 48 to the under side of the handle 45 is a pawl 49, the inner end of which is normally pressed downward by a spring 50 into engagement with the upper surface of the ring 44. The inner end of the pawl 49, however, may be lifted by means of a push-button 51 in the knob 46, said push-button having a downward extension 52 which normally engages the outer end of said pawl. If it is desired to move the handle 45 to its off position after it has been moved to a running position, it is necessary to depress the button 51. By this arrangement it is impossible for the handle accidentally to fly back to the off position. The spindle end of the handle is held in place by means of a flange 71 fastened to the cap plate.

When the handle 45 is turned in a clockwise direction, the motion is transmitted by means of the feather 47 to the spindle 27 and by means of the feather 40 to the drum 38. The threaded portion 28 of the spindle 27 screws downward into the nut 29, which is prevented from moving upward by means of the brackets 31, and the transmitting block 26 on which the lower part of the spindle presses, bears down upon the equalizing disk 25, subjecting the resistance medium to pressure. The pressure on the resistance medium increases with the angle through which the handle is swung. When the handle is moved in a counter-clockwise direction from the off position, the spindle has a tendency to rise, but this is prevented by means of a collar 53 which is fastened to the spindle and bears against the under side of the cap plate 36. The nut 29 is therefore forced downward against the transmitting block 26 and the carbon disks are again subjected to pressure. When the handle is moved from off position to a starting position there is practically no pressure on the carbon piles 10 and the resistance of the same is very high, but as the handle is moved farther in the same direction, pressure is transmitted to the carbon piles gradually reducing the resistance. When the handle is swung into its extreme clockwise or counter-clockwise position the carbon piles are subjected to the maximum pressure and the resistance of the piles is a minimum. At this point the carbon piles are short-circuited by means of the contact fingers engaging short-circuiting segments on the drum. Located on the lower ends of the rods 35 and under the bottom plate 14 are regulating or adjusting springs 55 which are held in place by nuts 56. An oil-filled tank 57 inclosed in the controller case surrounds the controlling apparatus and is so constructed as to allow its downward movement for the inspection or repair of the controller.

The controller above described is especially designed for high potential service. For lower potential, I prefer to use the modification shown in Fig. 5. In this latter case pressure on the carbon piles is created by the action of a cam 58 operated by a handle 59. This handle is provided with a spring-operated locking arrangement similar to that shown in Fig. 1. A drum switch 60 is mounted on a spindle 61, one end of which passes through the operating handle 59 and through a plate 73 provided with notches for the reception of a pawl 72, while the other end of the spindle is supported in a bearing 62. This drum is provided with contact segments 68 which coöperate with contact fingers 69 as the drum is rotated. The bearing 62 is mounted on the cap plate 63 as is a protecting shell 64 which surrounds the drum 60 preventing the admission of foreign matter. When the operating handle 59 is moved to the right or to the left from the off position, the action of the cam 58 forces a transmitting pin 65 against an equalizing disk 66 which is provided with studs 67 and guide grooves 70. These studs transmit the pressure to the carbon piles as before.

In Fig. 9 I have shown complete electrical connections of the controller to be used in a three-phase system, and in Fig. 10 the connections of the controller to be used in a two-phase system, the drum switch being shown in development in each case. In the first case the handle is swung through an angle of practically 45° on either side of the off position before the contact fingers come in contact with the short-circuiting segments on the drum switch; thus short-circuiting the resistance medium. In the second case the handle is swung through an angle of 90° accomplishing the same result.

Referring more particularly now to Fig. 9, I have shown the controller in the off position. One set of contact fingers $a$, $b$, $c$, $d$, $e$, $f$, and $g$ is shown between two sets of contact segments, and another set of contact fingers $a'$, $b'$, $c'$, and $d'$ is shown at a distance from the first mentioned contact fingers which corresponds to an angular swing of the drum switch through 90°. When the drum switch is rotated in a forward direction, contact segments $d^2$ and $c^2$ coöperate with contact fingers $d'$ and $c'$ respectively and contact segments $d^3$ and $c^3$ coöperate with contact fingers $d$ and $c$ respectively. The supply main $L'$ is then connected with one terminal $M'$ of the primary winding of the motor. At the same time supply mains $L^2$ and $L^3$ are connected with the two other terminals $M^2$ and $M^3$ of the motor primary through their respective contacts. When the primary circuit is complete a current is induced in the secondary winding of the motor which completes its circuit through the compressible resistance medium comprising three carbon piles $p'$, $p^2$ and $p^3$. As mentioned before, the carbon piles are subjected to pressure as the drum is rotated in either direction from the off position. The resistance medium is subjected to its maximum pressure just at the point where the short-circuiting segment $e'$ coöperates with the short-circuiting fingers $e$, $f$, and $g$, thus short-circuiting the resistance from the secondary circuit of the motor and allowing the maximum current to be induced in the secondary to produce the maximum torque. When the drum switch is rotated in a backward direction, supply main $L'$ is connected with the same primary terminal $M'$, but main $L^2$ is connected with $M^3$ and $L^3$ with $M^2$, thus interchanging two of the three connections to the primary winding and reversing the direction of rotation of the motor.

The connections made by the drum switch in the two phase system, shown in Fig. 10, may be traced readily. When the drum switch is rotated in a forward direction, the supply mains $L'$, $L^2$, $L^3$ and $L^4$ are respectively electrically connected to the terminals $M'$, $M^2$, $M^3$, and $M^4$ of the primary winding of the motor. When the switch is rotated in the backward direction, supply mains $L'$ and $L^2$ are respectively electrically connected to the primary terminals $M'$ and $M^2$ as before, but main $L^3$ is connected to terminal $M^4$ and $L^4$ to $M^3$, thus causing the rotor to be rotated in the opposite direction.

In Fig. 9 I have shown the drum switch provided with four rows of contact segments, while only three rows are necessary for the three phase system. But with this arrangement the controller can be connected readily for use in a two phase circuit.

In this particular case I have shown three carbon piles, but the number of resistance units may however be varied. They may be grouped and connected according to special requirements.

It is evident that many substitutions and modifications may be made in the particular structures herein shown and described, and I intend to cover in my claims the broad features of my invention including all such obvious modifications and substitutions.

What I claim as new is:

1. In combination, an electric motor, a controller therefor comprising a compressible resistance medium, a spindle provided with a double acting thread, a nut engaging said thread, a drum, and a handle for operating said spindle and drum and regulating the pressure transmitted through said nut to said resistance medium.

2. In combination, an electric motor, a controller therefor comprising a compressible resistance medium, a spindle provided with a thread, a nut engaging said thread, a transmitting block on which said nut rests, and a handle for operating said spindle and regulating the pressure transmitted through said nut and transmitting block to said resistance medium.

3. In combination, a motor, a controller therefor comprising a compressible resistance medium, a drum switch, a plurality of movable threaded transmitting members, and a handle for operating said drum switch and regulating the pressure to which said resistance medium is subjected.

4. In combination, an electric motor, a controller therefor comprising a compressible resistance medium, a spindle provided with a thread, a nut provided with shoulders and engaging the thread of said spindle, pedestals provided with brackets which prevent an upward movement of said nut, and a handle for regulating the pressure to which said resistance medium is subjected.

5. In combination, an electric motor, a controller therefor comprising a compressible resistance medium, a spindle provided with feathers and a thread, a nut engaging said thread, a controller drum mounted loosely on said spindle, a controller handle mounted on the upper end of said spindle, said handle arranged to transmit motion to said spindle and said drum by means of said feathers and to regulate the pressure to which said resistance medium is subjected by means of said nut.

6. In combination, an alternating current motor, a controller therefor comprising a compressible resistance medium, a spindle, a collar mounted on said spindle to prevent its upward movement, and a handle for operating said spindle and regulating the pressure to which said resistance medium is subjected.

7. In combination, an electric motor, a controller therefor comprising a compressible resistance medium, a drum, a table, pedestals provided with arms and mounted on said table to prevent the downward movement of said drum, and a handle for operating said drum and regulating the pressure to which said resistance medium is subjected.

8. In combination, a motor, a controller therefor comprising a compressible resistance medium, an equalizing disk, a plurality of movable threaded transmitting members, a drum switch, and a handle for operating said drum switch and regulating the pressure transmitted through said transmitting members and equalizing disk to said resistance medium.

9. In combination, an electric motor, a controller therefor comprising a compressible resistance medium, a table, pedestals mounted on said table, rods, contact fingers clamped to said rods, a drum provided with contact segments coöperating with said contact fingers, and a handle for operating said drum and regulating the pressure to which said resistance medium is subjected.

10. In combination, an electric motor, a controller therefor comprising a compressible resistance medium, a plurality of transmitting members, a table surrounding one of said transmitting members to guide one of them, and a handle for regulating the pressure transmitted through said transmitting members to said resistance medium.

11. In combination, an alternating current motor, a controller therefor comprising a plurality of carbon piles surrounded by and insulated from oil tight metal tubes, heat-radiating rings surrounding said tubes, a drum switch, and a handle for operating said drum switch and regulating the pressure to which said carbon piles are subjected.

12. In combination, an electric motor, a controller therefor comprising a compressible resistance medium, a plurality of movable threaded transmitting members, a drum switch, a plate having a series of teeth, a handle operating said drum switch and regulating the pressure transmitted through said transmitting members to said resistance medium, and a pawl carried by said handle and coöperating with said teeth to prevent accidental movement of said drum switch.

13. In combination, an electric motor, a controller therefor comprising a compressible resistance medium, a spindle provided with a thread, a nut engaging said thread and being effective for compression of the resistance medium in both directions of rotation, and a handle for operating said spindle and regulating the pressure transmitted through said nut to said resistance medium.

14. A controller for electric motors comprising a compressible resistance medium, a plurality of threaded transmitting members, a drum switch, an oil-filled tank surrounding said resistance medium, transmitting members and said drum, a handle for operating said drum switch and regulating the pressure to which said resistance medium is subjected.

15. In combination, an electric motor, a controller comprising a compressible resistance medium, a plurality of transmitting members, a cap plate provided with holes, rods having diameters smaller than said holes and which pass through them, an equalizing disk for equalizing the pressure on said resistance medium and which is provided with guide grooves through which said rods pass, said cap plate being movable in any direction to provide for the shifting of one of said transmitting members, and a handle for regulating the pressure transmitted through said transmitting members to said resistance medium.

16. In combination, an electric motor, a controller therefor comprising a compressible resistance medium, a transmitting member, a cap plate for shifting said transmitting member, an equalizing disk provided with studs arranged to bear upon said resistance medium, a handle for regulating the pressure to which said resistance medium is subjected.

17. In a controller for alternating current motors, the combination of a single drum switch for opening and closing the primary circuit of the motor and for reversing the motor, a compressible resistance medium in the secondary circuit of said motor, and an oil filled tank surrounding said drum switch and resistance medium.

18. A controller for alternating current motors comprising a compressible resistance medium in the secondary circuit of said motor, a drum switch for opening and closing the primary circuit of said motor and for reversing said motor, and a handle for operating said drum switch and regulating the pressure to which said resistance medium is subjected.

19. In an electric controller, the combination of a compressible resistance medium, a plurality of movable threaded transmitting members, a drum switch at which the main circuit is made and broken, and a handle for operating said drum switch and arranged to control the transmission of pressure transmitted through said transmitting members to said resistance medium.

20. In a controller, a plurality of frame-supporting rods, springs surrounding said rods, a plate mounted on said springs, a variable resistance medium mounted on said plate, a drum, and a handle for operating said drum and regulating the pressure to which said resistance medium is subjected.

21. In an alternating current controller, the combination of carbon disks inclosed by metal tubes and insulated therefrom, said tubes provided with heat-radiating rings, and a spring-mounted plate, said tubes supported thereby, and means for subjecting said carbon disks to pressure.

22. In an electric controller, the combination of a support, a resilient member mounted on said support, a plate mounted on said resilient member, a variable resistance medium mounted on said plate, and means for regulating the pressure to which said resistance medium is subjected.

23. In an electric controller, the combination of a variable resistance medium, a spindle provided with a thread, a nut engaging said thread, and means so arranged as to cause pressure to be transmitted through said spindle to said resistance medium when said spindle is rotated in one direction and to cause pressure to be transmitted through said nut to said resistance medium when said spindle is rotated in the other direction.

Milwaukee, Wis., April 8, 1909.

In testimony whereof I affix my signature, in the presence of two witnesses.

HERBERT W. CHENEY.

Witnesses:
H. C. CASE,
CHAS. L. BYRON.